United States Patent [19]

Friedman

[11] Patent Number: 4,809,117
[45] Date of Patent: Feb. 28, 1989

[54] COMBINATION REMOTE HAND CONTROL/FOOT PEDAL CONTROL SYSTEM FOR VCR

[75] Inventor: Robert S. Friedman, Dallas, Tex.

[73] Assignee: Dallas Cowboys Football Club Limited, Irving, Tex.

[21] Appl. No.: 19,884

[22] Filed: Feb. 27, 1987

[51] Int. Cl.⁴ .................. G11B 15/18; G11B 17/00; G11B 19/02
[52] U.S. Cl. .................. 360/137; 360/74.1; 358/194.1
[58] Field of Search .................. 360/137, 72.1, 72.3, 360/74.1; 358/194.1

[56] References Cited

U.S. PATENT DOCUMENTS 4,410,923  10/1983  Patel .................. 360/137
4,718,112   1/1988  Shinoda .............. 358/194.1

Primary Examiner—John H. Wolff
Attorney, Agent, or Firm—Richards, Harris, Medlock & Andrews

[57] ABSTRACT

A foot pedal operated remote control unit is provided as part of a remote control system for operating a video cassette recorder (VCR). The foot pedal is connected to a hand-held, multi-function remote control unit for operating the VCR. The foot pedal is used to control one or more selected playback functions, such as, while viewing video recordings. The foot pedal remote control unit is useful for viewing video segments requiring repeated playback for analysis by a viewer whose hands are occupied in performing other tasks.

12 Claims, 1 Drawing Sheet

COMBINATION REMOTE HAND CONTROL/FOOT PEDAL CONTROL SYSTEM FOR VCR

TECHNICAL FIELD

This invention relates to remote control systems for operating video cassette recorders (VCRs) and, in particular, to a foot pedal remote control unit used in conjunction with a hand-held control unit for controlling various playback functions of VCRs.

BACKGROUND OF THE INVENTION

The technological advances in video cassette recorders (VCRs) have increased their versatility and have led to the use of VCRs in a wide range of applications. One such application is the video recording of an action sequence, such as a sporting event, for later review and analysis. Action sequences that lend themselves to video recording for detailed analysis include the operation of machines, the physical movements of workers at a workplace, and the performance of athletic teams.

During the study and analysis of actions recorded on video cassettes, the operator of the VCR generally needs to view various sections of the recording repeatedly to see and fully understand the sequence of the action. To accomplish repeated playback, the VCR operator must use a control unit to alternate the function with the playback function. This is typically accomplished with a standard hand-held remote control unit having a plurality of push buttons for controlling the various VCR playback functions.

In some situations requiring repeated playback of video recordings, it may be desirable or necessary for the viewer to use his hands for other tasks while operating the VCR. For example, a video recording of an athletic team in action may be shown for instructional purposes. In this situation, an athletic coach may be operating the VCR to show a play repeatedly, by using the VCR functions of reverse and slow motion, while writing notes with his hand or using a pointer to focus the attention of the audience on a particular aspect of the action being studied.

Therefore, a need has been identified for a VCR remote control system that provides a viewer with control over the various video playback functions of the VCR while the viewer performs other tasks with his hands.

SUMMARY OF THE INVENTION

The present invention comprises a remote control system for operating a video cassette recorder (VCR). The system includes a standard television monitor connected to a VCR. The VCR may be used for viewing video recordings by operating the controls on the face of the VCR or by operating a hand-held remote control unit. The remote control unit is linked to the VCR by either an electronic cable connecting the remote control unit to the VCR or by a transmitter in the remote control unit that transmits control signals, such as infrared signals, to a receiver in the VCR. The remote control unit allows a viewer to operate the VCR by selecting various video playback functions, such as fast forward, slow motion, freeze frame, and rewind.

The remote control system of the present invention includes a foot pedal electronically connected to a hand-held remote control unit. The foot pedal allows a viewer to operate the VCR while keeping his hands free for performing other tasks.

The foot pedal of the present invention is used to control at least one of various playback functions that can be performed by the VCR. For example, the foot pedal may be used to command the reverse function to facilitate repeated viewing of a segment of the video recording. The foot pedal also may be designed to control the speed and direction of the playback, including the functions of fast forward, forward, slow forward, freeze frame, reverse, and fast rewind. In addition, the hand-held remote control unit may be designed to include controls for selecting various playback functions to be operated by the foot pedal. Providing the capability for selecting various playback functions to be controlled by the foot pedal gives the remote control system of the present invention great versatility for use in a wide range of applications.

BRIEF DESCRIPTION OF THE DRAWING

For a more complete understanding of the present invention and for further advantages thereof, reference is now made to the following Description of the Preferred Embodiments taken in conjunction with the accompanying Drawings, in which.

DESCRIPTION OF THE PREFERRED EMBODIMENTS

Figure 1:
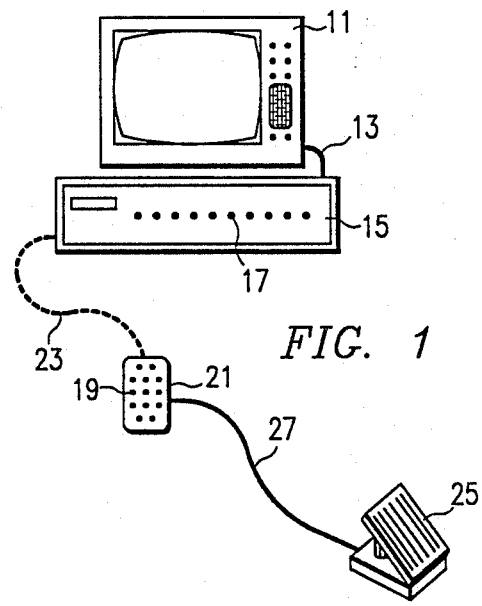
FIG. 1 is a schematic illustration of a video cassette recorder and the remote control system of the present invention.

Referring to the FIGURE, a system for viewing video recordings is illustrated. The system includes a television monitor 11 electronically connected by a cable 13 to a video cassette recorder (VCR) 15. VCR 15 may be used to playback video recordings for viewing on the television monitor 11. VCR 15 may be operated by control switches or push buttons 17 on the face of VCR 15 or by control switches or push buttons 19 on a remote control unit 21. Remote control unit 21 comprises a hand-held, multi-function remote control linked to VCR 15 by a communication link 23. Communication link 23, illustrated in the FIGURE as a dotted line, may be an electronic cable physically connecting remote control unit 21 to VCR 15, or communication link 23 may comprise signals transmitted by a transmitter (not shown) contained in remote control unit 21 and received by a receiver (not shown) contained in VCR 15. Television monitor 11, VCR 15, remote control unit 21, and communication link 23 are well known in the art and are marketed by various manufacturers under numerous brand names. Monitor 11 and VCR 15 may be combined in a single unit.

The remote control system of the present invention includes a foot operated pedal 25 electronically connected to remote control unit 21 by a cable 27. Foot pedal 25 is connected to remote control unit 21, preferably with a quick release jack, so as to control at least one of the various playback functions of VCR 15. For example, foot pedal 25 may be connected to control the function of reverse to facilitate the repeated viewing of selected passages of the video recording. In an alternative embodiment, foot pedal 25 may control both the speed and direction of the video playback, including the functions of fast forward, forward, slow forward, freeze frame, reverse, and fast rewind. In addition, remote control unit 21 may be designed to be programmable so that an operator can select the playback function or functions to be controlled by foot pedal 25. Providing foot pedal 25 with control over selected playback functions of VCR 15 gives the entire video system versatility so that it may be used in a wide range of applications. For example, providing foot pedal 25 with control over the speed and direction of the video playback facilitates operation of VCR 15 by an instructor or coach whose hands are occupied with other tasks such as using a pointer or taking notes while giving a video presentation.

Figure 2:
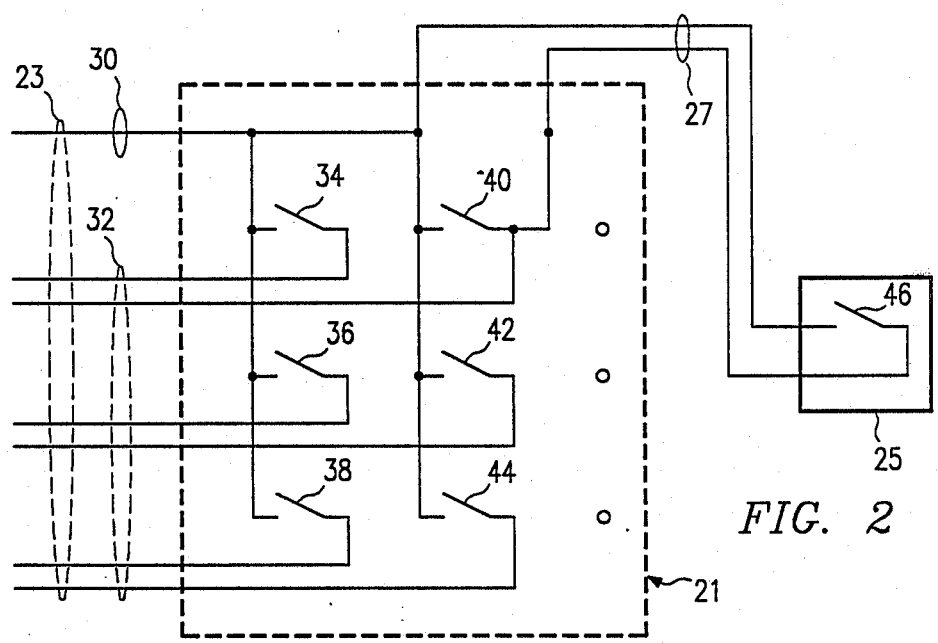
FIG. 2 is an electrical schematic illustrating the circuitry for the hand-held control unit and foot pedal control unit.

An electrical schematic of the hand-held control unit 21 and the foot operated pedal 25 is shown in FIG. 2. The communication link 23, in this embodiment, consists of a common line 30 and a group of control lines 32. The control unit 21 includes a group of push button switches which are shown, for example, as switches 34, 36, 38, 40 42 and 44. The fixed contact of each of the switches is connected to the common line 30. Each of the switches has a corresponding control line that is within the group of control lines 32.

The common line 30 and a selected one of the control line comprise the cable 27. These two lines are connected to a switch 46 within the pedal 25. It can be seen that the switch 46 is connected in parallel with the switch 40. Switch 46 therefore provides the same function as that provided by the switch 40. In a selected embodiment of the present invention, the switches 40 and 46 provide the function of fast rewind. However, the switch 46 may be connected with any other switch within the control unit 21 to provide any one of the possible functions for controlling the VCR 15.

In summary, the present invention is a multi-function control system for a VCR wherein a foot operated control switch is connected to a hand-held control unit so that the foot operated switch can provide any one of the functions of the hand-held control unit.

Whereas the present invention has been described with respect to specific embodiments thereof, it is apparent that various changes and modifications may be suggested to one skilled in the art and it is intended that the present invention encompass such changes and modifications as fall within the scope of the appended claims.

I claim:

1. A remote control system for operating a video cassette recorder (VCR), comprising:
    a hand-operated multi-function remote control unit for generating control signals for operating the VCR and selecting various playback functions while viewing video recordings;
    a foot pedal switch connected to said remote control unit for generating a control signal for controlling at least one of said playback functions, and
    a communication link connected between said hand-operated remote control unit and said VCR for transmitting control signals generating by said hand-operated remote control unit and said foot pedal switch to the VCR for controlling operation of the VCR.

2. The remote control system of claim 1, wherein said communication link comprises an electronic cable connecting said remote control unit to the VCR.

3. The remote control system of claim 1, wherein said communication link comprises a transmitter in said remote control unit for transmitting said control signals and a receiver in the VCR for receiving said control signals.

4. The remote control system of claim 1, wherein said at least one of said playback functions controlled by said foot pedal is reverse.

5. The remote control system of claim 1, wherein said foot pedal switch controls the speed and direction of playback of the video recording.

6. The remote control system of claim 1, wherein said foot pedal switch controls a plurality of playback functions selectable by said remote control unit.

7. A remote control system for controlling the playback of video recordings on a video cassette recorder (VCR), comprising:
    a hand-operated remote control unit for generating control signals for operating the VCR and selecting various playback functions thereof;
    a foot pedal switch electrically connected to said remote control unit for generating a control signal for controlling at least a fast rewind function of said VCR, and
    a communication link connected between said hand-operated remote control unit and said VCR for transmitting the control signals produced by said remote control unit and said foot pedal switch from said remote control unit to the VCR for controlling operation of the VCR.

8. The remote control system of claim 7, wherein said foot pedal switch controls a plurality of playback functions of said VCR selectable by said remote control unit.

9. The remote control system of claim 7, wherein said foot pedal switch controls speed and direction of playback of the video recording of the VCR.

10. A method of controlling playback of video recordings on a video cassette recorder (VCR), comprising the steps of:
    generating control signals at a hand-operated multi-function remote control unit, said control signals transmitted through a communication link from said remote control unit to said VCR for operating the VCR and selecting various playback functions thereof, and
    generating at least one control signal for controlling at least one of the VCR playback functions at a foot pedal switch and transmitting the control signal from the foot pedal switch through a control line to said hand-operated control unit and further through said communication link to said VCR for controlling operation of said VCR.

11. The method of claim 10, further comprising:
    selecting with said remote control unit the playback functions to be controlled by said foot pedal switch.

12. The method of claim 10, wherein controlling said playback functions with said foot pedal switch includes controlling speed and direction of playback of the video recording produced by said VCR.

* * * * *

UNITED STATES PATENT AND TRADEMARK OFFICE
CERTIFICATE OF CORRECTION

PATENT NO. : 4,809,117

DATED : Feb. 28, 1989

INVENTOR(S) : Robert S. Friedman

It is certified that error appears in the above-identified patent and that said Letters Patent is hereby corrected as shown below:

Title page:

In the ABSTRACT, line 6, after "as" insert --reverse--.

Column 1, line 29, after "the" insert --reverse--.

Signed and Sealed this

Fifteenth Day of May, 1990

Attest:

HARRY F. MANBECK, JR.

*Attesting Officer*  *Commissioner of Patents and Trademarks*